United States Patent

Gyugyi

[15] 3,707,665
[45] Dec. 26, 1972

[54] POWER FREQUENCY CHANGER WITH CONTROLLABLE INPUT DISPLACEMENT FACTOR

[72] Inventor: Laszlo Gyugyi, Penn Hills, Pa.

[73] Assignee: Westinghouse Electric Corporation, Pittsburgh, Pa.

[22] Filed: Nov. 12, 1971

[21] Appl. No.: 198,204

Related U.S. Application Data

[63] Continuation-in-part of Ser. No. 84,795, Oct. 28, 1970, abandoned.

[52] U.S. Cl. .......................... 321/5, 321/7, 321/69 R
[51] Int. Cl. ............................................. H02m 5/22
[58] Field of Search ........................... 321/5, 7, 69 R

[56] References Cited

UNITED STATES PATENTS

| | | |
|---|---|---|
| 3,170,107 | 2/1965 | Jessee .................................. 321/7 X |
| 3,178,630 | 4/1965 | Jessee .................................. 321/7 |
| 3,419,785 | 12/1968 | Lafuze ................................. 321/5 X |
| 3,431,483 | 3/1969 | Lafuze ................................. 321/7 |
| 3,470,447 | 9/1969 | Gyugyi et al. ........................ 321/7 |
| 3,493,838 | 2/1970 | Gyugyi et al. ........................ 321/7 |

*Primary Examiner*—William M. Shoop, Jr.
*Attorney*—F. H. Henson et al.

[57] ABSTRACT

The invention relates to the operation of a frequency changer system comprised of bilateral switching elements in which the conduction intervals of the bilateral switching elements are shifted with respect to a selected time reference to vary the input displacement factor, or input power factor, of the frequency changer system.

6 Claims, 15 Drawing Figures

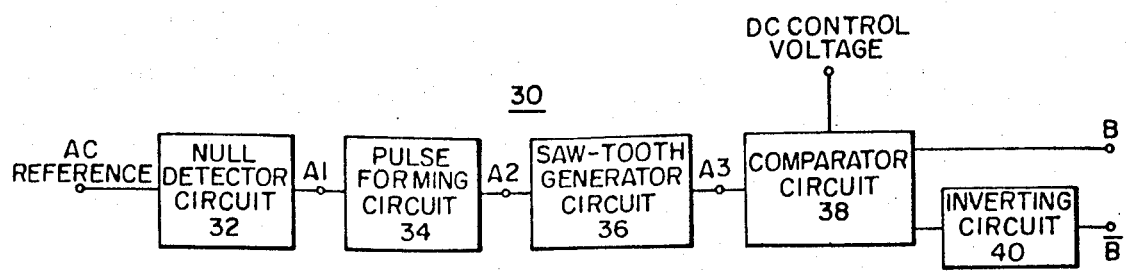
FIG. IA
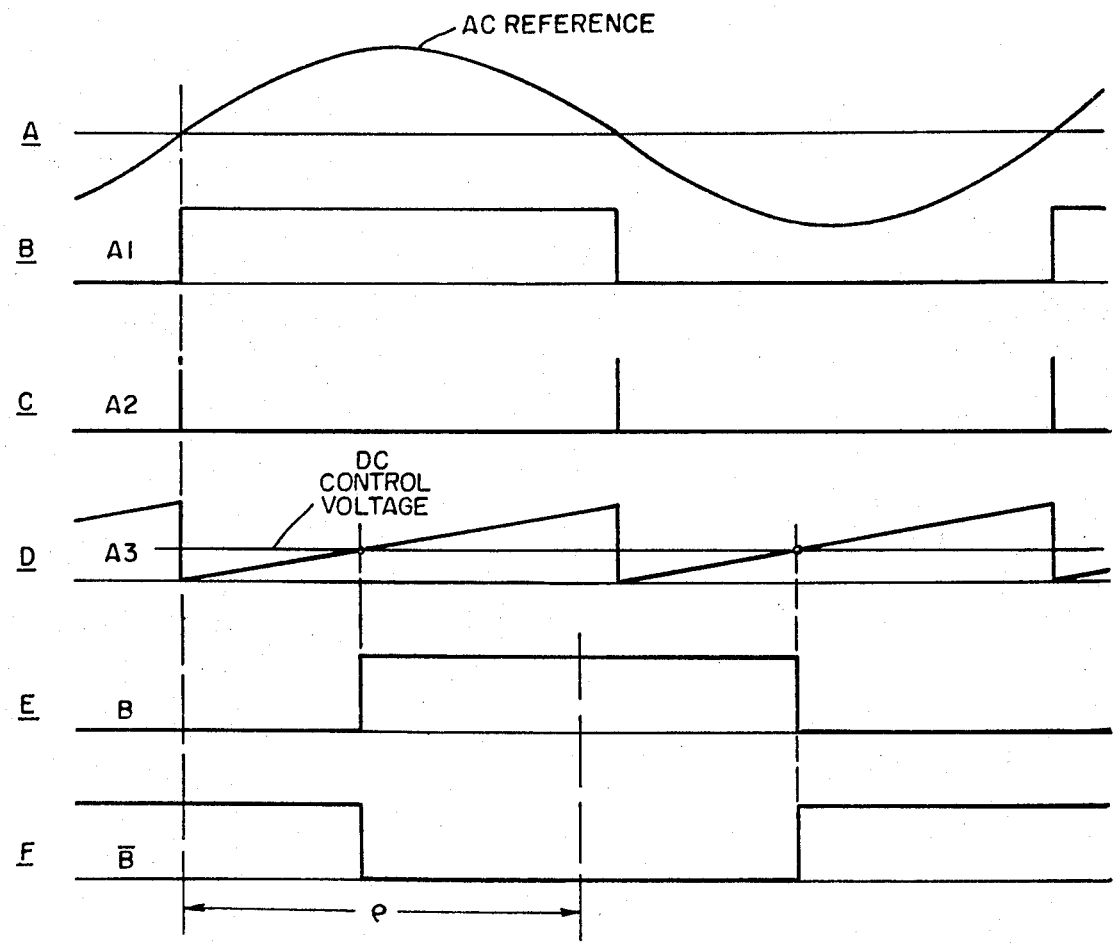
FIG. IB

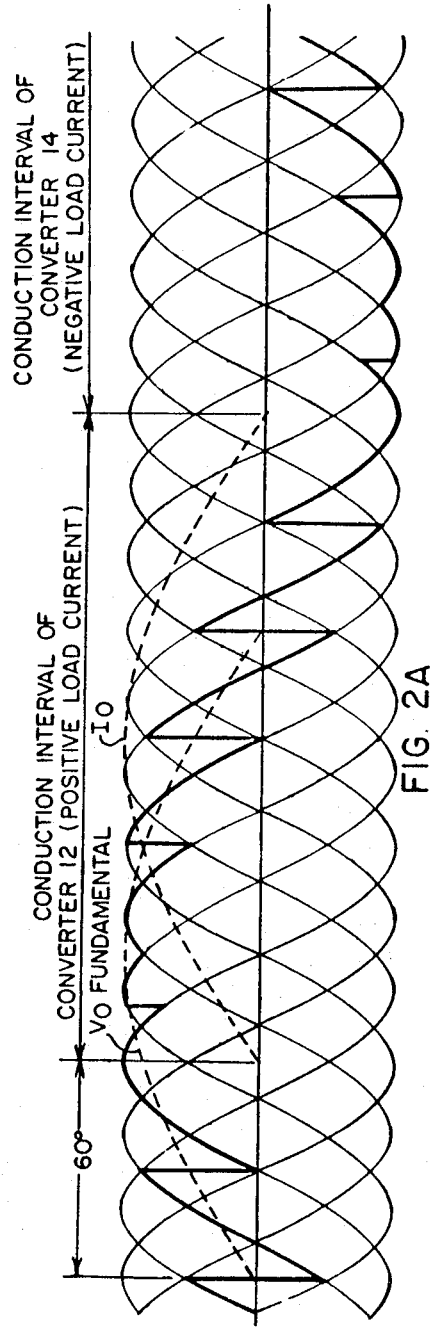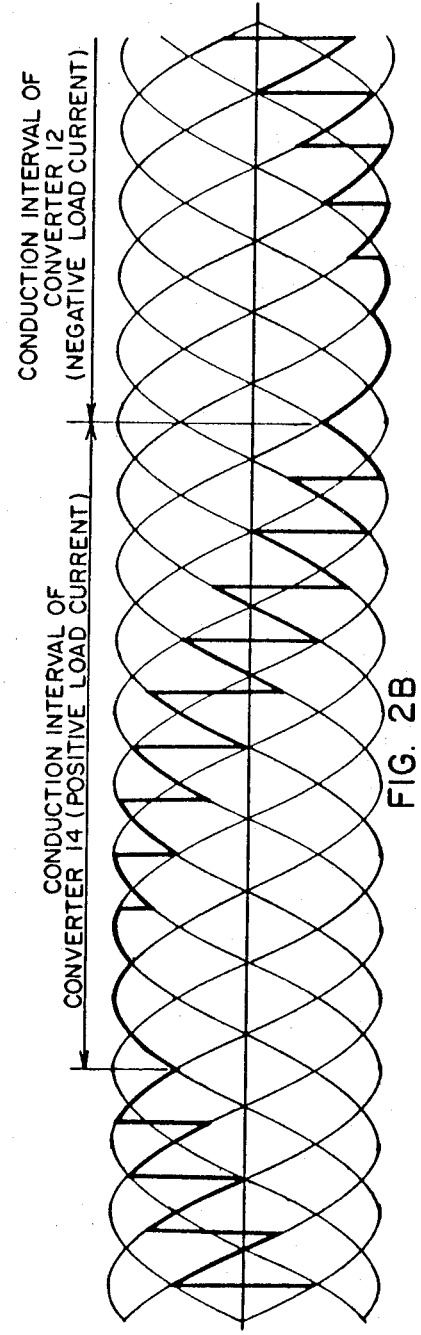

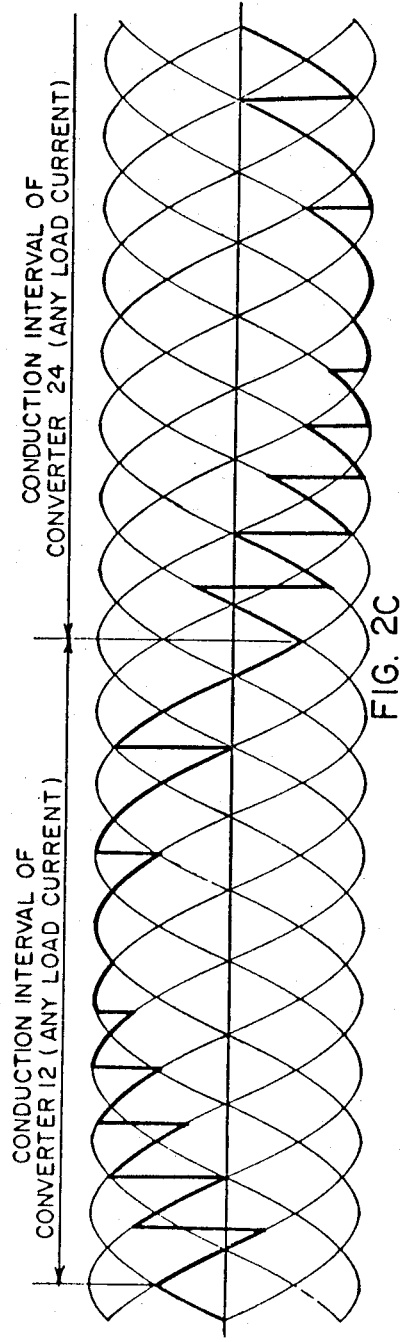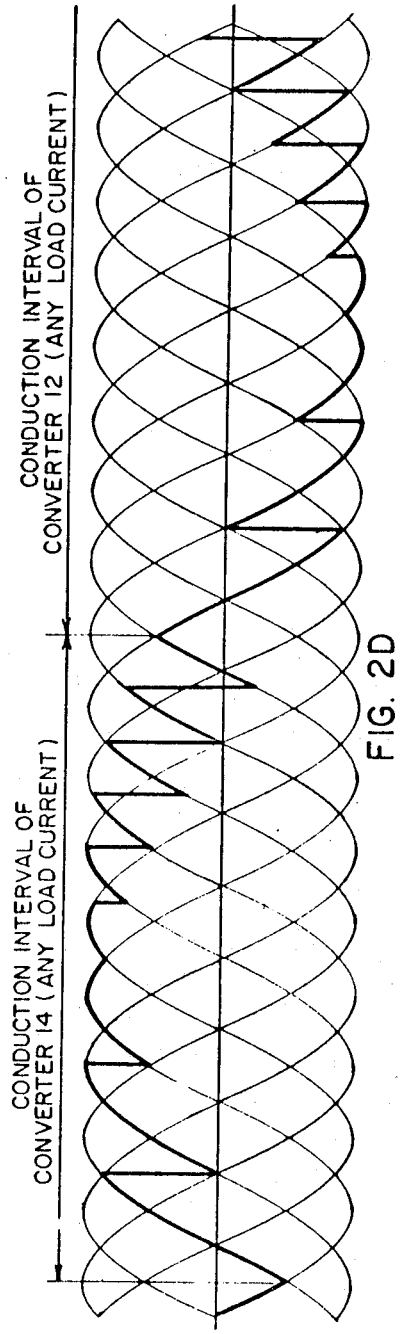

1

POWER FREQUENCY CHANGER WITH CONTROLLABLE INPUT DISPLACEMENT FACTOR

CROSS REFERENCE TO RELATED APPLICATIONS

This application is a continuation-in-part of application Ser. No. 84,795 filed Oct. 28, 1970, and now abandoned.

BACKGROUND OF THE INVENTION

State of the art frequency changers, be they naturally commutated frequency changers or force commutated frequency changers, exhibit input displacement factors, or input power factors, which are generally dependent upon the electrical load to which they are supplying AC power.

SUMMARY OF THE INVENTION

The frequency changer, or cycloconverter, is operatively connected to an AC input source of a first frequency and includes an arrangement of solid state switches, the conduction control of which determines the frequency and magnitude of the AC output of the frequency changer. The use of bilateral switching devices, which are capable of conducting current in both a forward and a reverse direction, in the frequency changer provides for arbitrary on-off conduction control of the bilateral switches independent of the zero crossing of the frequency changer output current, i.e., polarity of the output current, developed at an electrical load.

A specific embodiment of the invention comprises a frequency changer system including a pair of converters, each including an array of switches for generating component output waveforms which are selectively combined to develop the frequency changer output signal. The output voltage waveform of each converter is generated by appropriately phase modulating the firing angles of the switches with respect to the phases of the supply voltages by some suitable control technique, such as the sine wave crossing technique, such that the two converters produce the same mean output voltage with complementing waveshapes. These waveforms, which are similar to those produced by the positive and negative converters of a naturally commutated cycloconverter, can be developed by satisfying the following known basic relationship for the firing angles of the two converters:

$$\alpha_1 + \alpha_2 = 180°$$

where
$\alpha_1$ is the firing angle of first converter, and
$\alpha_2$ is the firing angle of the second converter.

Unlike the naturally commutated cycloconverter, however, which utilizes undirectional conducting switching devices such that the switching devices of each converter can conduct in only one direction, the frequency changer system comprising embodiment of this invention utilizes bilateral switching devices which are operated in a force commutated mode.

Inasmuch as the fundamental or mean output voltage of each of the converters is substantially the same, the arbitrary on-off conduction control of the bilateral switches of the converters according to the force commutated mode of operation, supports selective conduction control of the bilateral switches which permits the fabrication of an output voltage waveform comprised of selected segments of the output waveforms of the individual converters. In the simplest case the frequency changer output voltage is composed of alternate half-period sections of the output voltage waveforms of the two converters. This means that one of the converters supplies a load current for half of the output waveform cycle and the second converter supplies the load current for the other half of the output waveform cycle. The essence of this invention is the recognition that by judiciously choosing the position of the conduction intervals of the respective converters with respect to a chosen time reference the input displacement factor of the frequency changer system can be controlled.

In the case of the naturally commutated cycloconverter, the conduction intervals of the two converters must correspond to the polarity of the load current due to the use of undirectional switching elements in the two converters. This restriction results in a lagging input displacement factor, i.e., the fundamental component of the input current lags the corresponding supply voltage by an angle (input phase angle) which is dependent upon the load power factor and the relative amplitude of the generated output voltage. It is evident, that if the same conduction intervals are chosen for the two converters comprising the frequency changer operating in the force commutated mode as described above, then the input phase angle and the input displacement factor would be identical to that of the naturally commutated cycloconverter. It has been determined theoretically and verified experimentally that if the opposite intervals are chosen for conduction of the converters of the frequency changer then the input phase angle becomes opposite, or the mirror image of that associated with the naturally commutated cycloconverter. It follows therefore, that by varying the position of the conduction intervals of the converters with respect to the output current between the condition where the input phase angle produced is identical to that of the naturally commutated cycloconverter and the condition where it is opposite to the input phase angle of the naturally commutated cycloconverter, the input phase angle can also be varied between these conditions.

It has also been determined theoretically that a constant leading or lagging input power factor can be produced by establishing fixed conduction intervals such that one of the converters conducts during the first half of the output voltage half-cycle and the second converter conducts during the other half-cycle of the output voltage.

It is apparent that because of the bilateral switching devices, both the first and second converter can conduct current of either polarity. Therefore, in practice, it is sufficient to employ either of the converters and apply the firing angles $\alpha_1$ and $\alpha_2$ to this converter during the respective first and second conduction intervals.

DESCRIPTION OF THE DRAWINGS

The invention will become more readily apparent from the following exemplary description in connection with the accompanying drawing in which:

FIG. 1A is a schematic block diagram illustrating typical components of the displacement circuit of FIG. 1;

FIG. 1B is a waveform illustration of the operation of the block diagram schematic of FIG. 1A;

FIGS. 2A, 2B, 2C and 2D are waveform illustrations of the conduction of the converters of the frequency changer system of FIG. 1 and specified conduction positions;

DESCRIPTION OF THE PREFERRED EMBODIMENT

Figure 1:
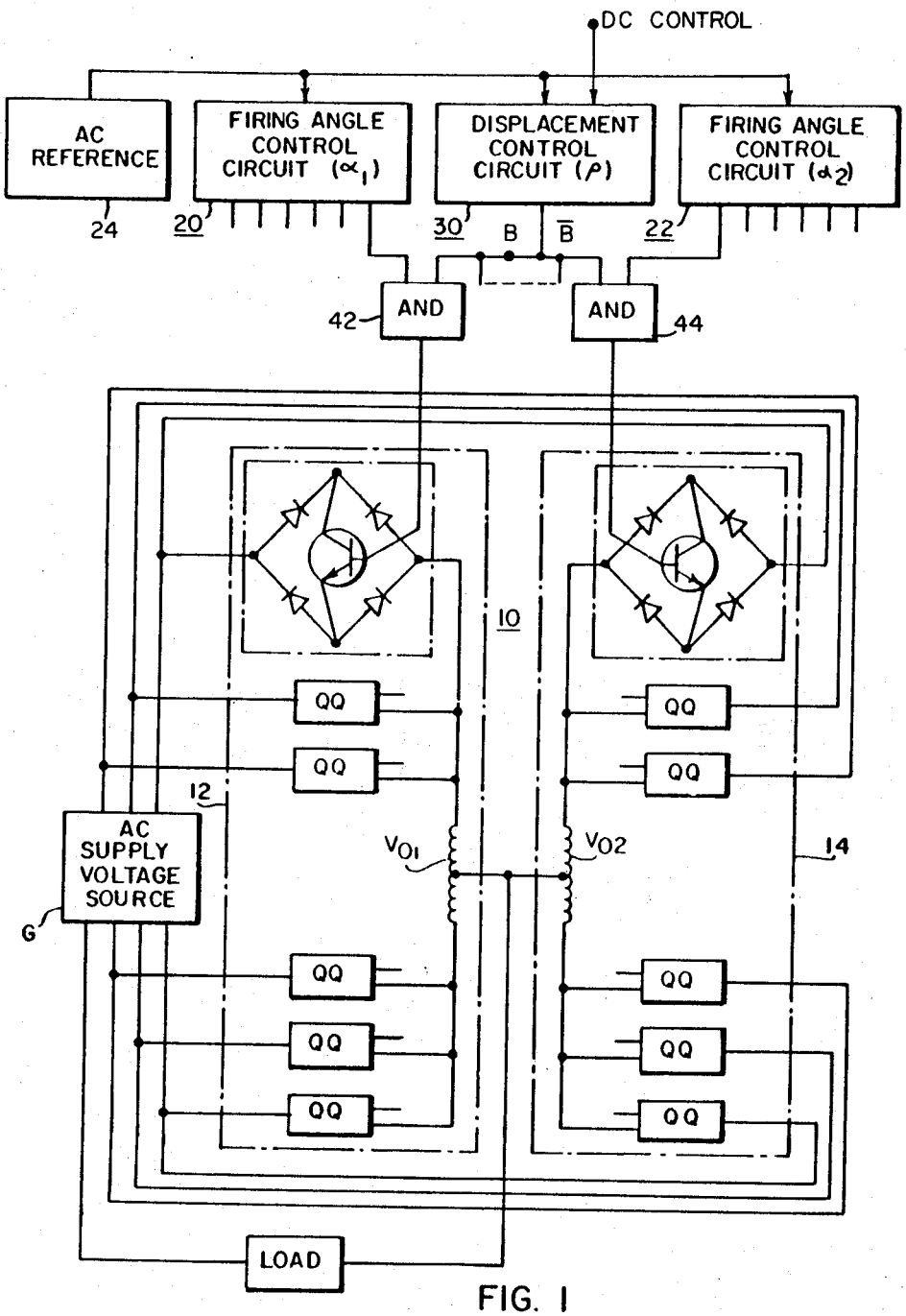
FIG. 1 is a schematic illustration of a basic frequency changer comprising a first and second converter circuit.

Referring to FIG. 1 there is illustrated a "six-pulse" frequency changer system 10 comprised of converters 12 and 14 which are operatively connected to an AC input voltage supply source G. Each of the converters is comprised of bilateral switching elements QQ, the conduction control of which is established by firing angle control circuits 20 and 22 in a predetermined pattern to develop a desired AC output waveform $V_{out}$ which is a composite of the output waveforms generated by each of the converters 12 and 14. Numerous solid state devices are available for implementing the bilateral conducting characteristics of the bilateral switching elements QQ. Furthermore, the selection of the six-pulse frequency changer system for describing the invention is by way of example only. As is known in the art, the output voltage waveforms $V_{01}$ and $V_{02}$ of the converters 12 and 14, respectively, are generated by appropriately phase modulating firing angles of the bilateral switching elements QQ with respect to the phases of the supply voltages of the input supply source G by some suitable control technique, such as the sine wave crossing of an AD reference waveform produced by reference source 24.

Firing angle control circuit 20 develops firing angles $\alpha_1$ for the bilateral switches of the converter 12 while firing angle control circuit 22 develops firing angles $\alpha_2$ for the bilateral switches of converter 14. Typical voltage output waveforms $V_{01}$ and $V_{02}$ comprised of discrete voltage segments corresponding to the firing instants of the bilateral switches as developed by the firing angle control circuits, 20 and 22 are illustrated in waveforms A of FIGS. 4 and 5. The operation of the firing angle control circuits 20 and 22, using the method of intersecting a timing wave of the supply frequency with an AC reference wave of the desired output frequency, is described in detail in U.S. Pat. No. 3,431,483 issued to D. L. Lafuze on Mar. 4, 1969 and assigned to the General Electric Corporation.

A displacement circuit 30 driven by a reference signal, herein selected to be the AC voltage reference, responds to a control input signal, herein chosen to be a DC voltage, by developing complementary square waves B and $\overline{B}$ at a frequency corresponding to that of the AC voltage reference. The displacement circuit 30 provides controllable phase displacement ($\rho$) of the complementary square waves with respect to said reference and consequently with respect to the fundamental voltage components of the waveforms $V_{01}$ and $V_{02}$.

The operation of the displacement circuit 30 is further explained with reference to FIGS. 1A and 1B. There is illustrated in block diagram form in FIG. 1A the functional components of the displacement circuit 30 while the waveforms of FIG. 1B illustrate the step by step derivation of the complementary square wave outputs B and $\overline{B}$ illustrated in FIGS. 4 and 5. The AC reference signal illustrated as waveform A is applied to a null detector circuit 32 which responds to the zero crossing points of the AC reference by producing a square wave output A1, illustrated as waveform B, at a frequency equal to the AC reference signal. The square wave output A1 is applied to a pulse forming circuit 34, which for the purposes of discussion, may be a simple differentiator circuit, which produces a series of pulses A2 illustrated as waveform C of FIG. 1B, coinciding with the leading and trailing edges of the square wave A1. The pulses A2 function to identify the 180° intervals of the AC reference signal. In order to provide a square wave with controllable displacement with respect to the AC reference signal, a linear sawtooth voltage is produced by a sawtooth generator circuit 36 in response to the pulses A2. The output of the sawtooth circuit A3, which is illustrated as waveform D of FIG. 1B, is fed to a first input of a comparator circuit 38, while the DC control voltage signal is applied to a second input of the comparator circuit 38. The comparator circuit 38 produces a square wave output B as illustrated in waveform E of FIG. 1B, corresponding to the crossing points of the sawtooth voltage A3 and the DC control voltage. The second of the complementary square waves $\overline{B}$ is developed by applying square wave signal B to a signal inverting circuit 40. The relative position or phase displacement of the complementary square waves B and $\overline{B}$ with respect to the AC reference signal is controlled by varying the magnitude of the DC voltage signal, thereby changing the point of intersection between the DC voltage signal and the sawtooth voltage. The operation of a comparator circuit 38 similar to the comparator circuit 38 is illustrated and described in detail in copending application Ser. No. 17,131 filed Mar. 6, 1970 by Robert M. Oates, entitled, "Apparatus for Controlling Pulse Wick Modulation of Inverter Circuits", and assigned to the assignee of the present invention.

Figure 4:
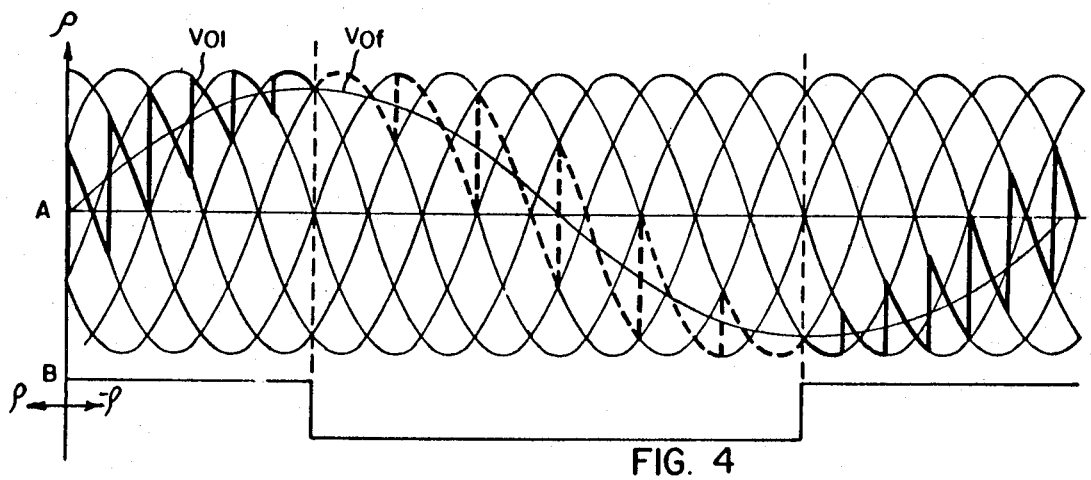
FIGS. 4 and 5 are waveform illustrations of the conduction of the first and second converters of the embodiment of FIG. 1.
Figure 5:
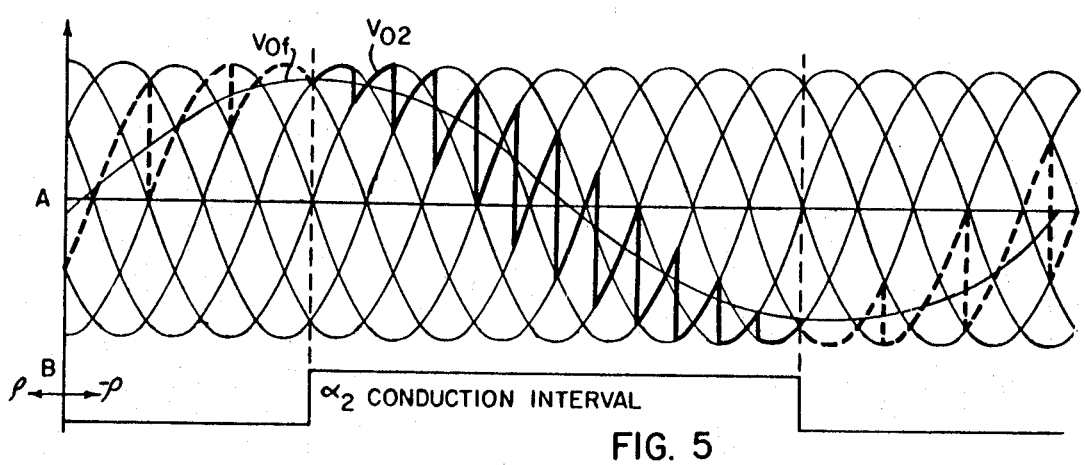
Figure 6:
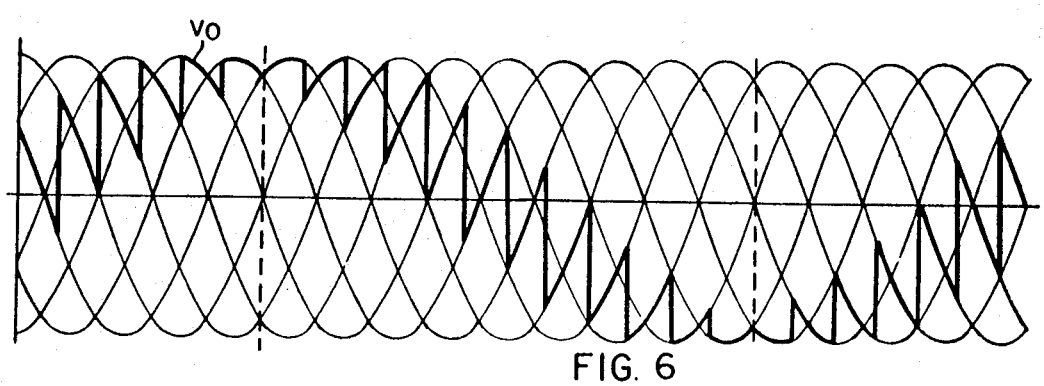
FIG. 6 is a waveform illustration of the combination of the waveforms of FIGS. 4 and 5.

The complementary square wave outputs B and $\overline{B}$ of the displacement circuit 30 function as gating signals for logic and gates 42 and 44 to alternately apply gate firing pulses $\alpha_1$ and $\alpha_2$ to the converter circuits 12 and 14, respectively. The gating signals B and $\overline{B}$, and the corresponding intervals of waveforms $V_{01}$ and $V_{02}$ fabricated by the two converter circuits 12 and 14, respectively, in response to the applied firing pulses $\alpha_1$ and $\alpha_2$ are illustrated in FIGS. 4 and 5. Inasmuch as the fundamental components of the waveforms $V_{01}$ and $V_{02}$ are identical, the conduction intervals of converter circuits 12 and 14 may be arbitrarily established by the displacement circuit 30 to fabricate a composite frequency changer system output $V_0$ as illustrated in FIG. 6.

In order to clearly describe and define the invention as it pertains in the mode of operation of a frequency changer comprised of a first and second converter, the description will utilize operating conditions comparable to a naturally commutated cycloconverter. While this analogy will assist in the understanding of the invention it is emphasized that the frequency changer system embodying this invention relies upon the use of bilateral switching elements which support arbitrary on-off conduction control and exhibit current conducting capabilities in both a forward and a reverse direction in contrast to the unilateral conducting devices employed in the naturally commutated frequency changer. Furthermore it will become apparent that due to the use of bilateral switching devices, that either converter 12 or 14 can be utilized to generate the composite output waveform and the corresponding controllable input displacement factor.

Figure 3A:
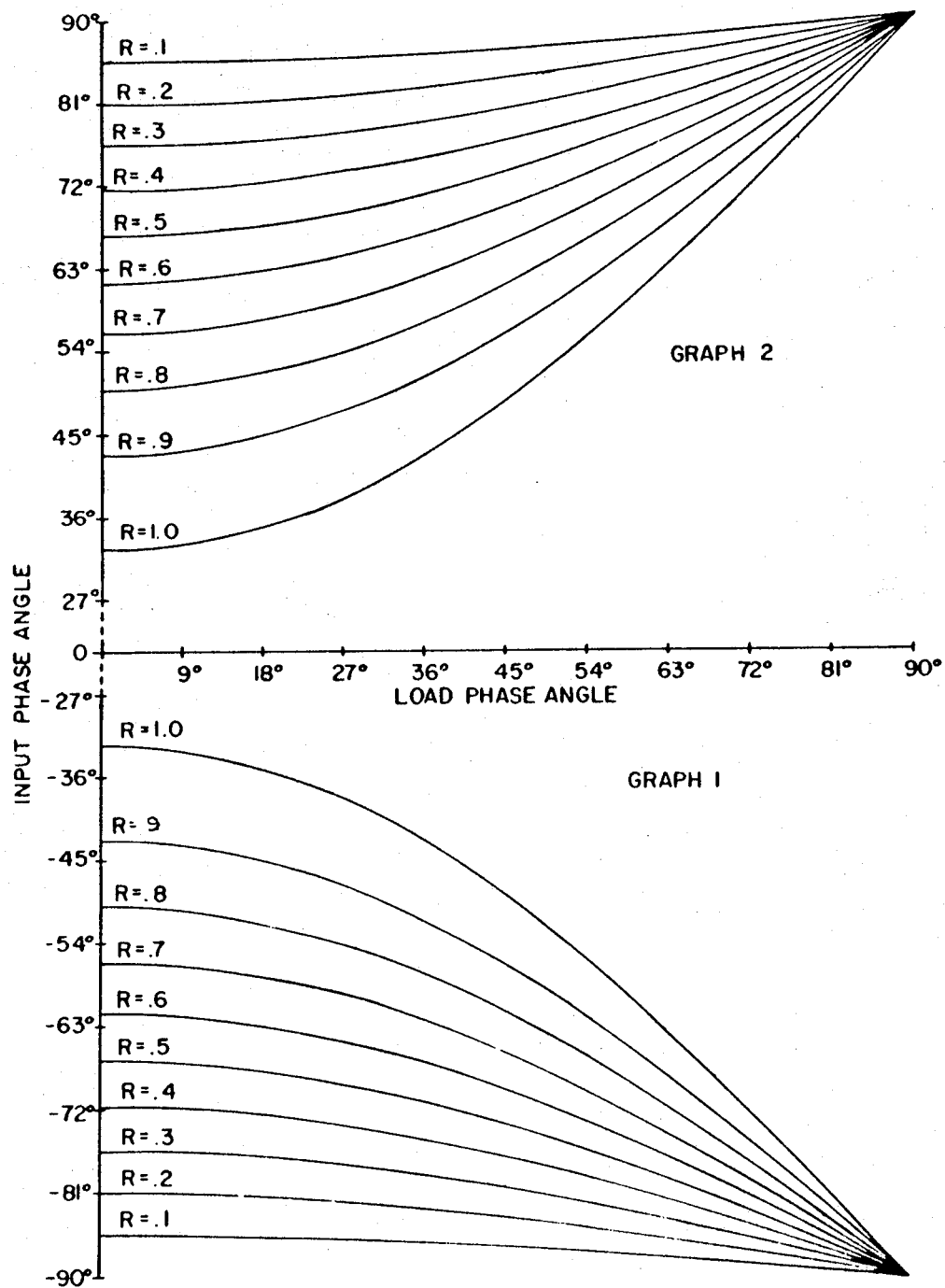
FIGS. 3A and 3B are graphical illustrations depicting input phase angle versus load phase angles for the converter operations corresponding to the waveforms of FIGS. 2A–2D.

The output voltage waveform $V_0$ of the frequency changer system 10 corresponding to conduction intervals of converters 12 and 14 of a naturally commutated cycloconverter at a load angle of 60° lagging (the load current $I_0$ lags the fundamental component $V_{0f}$ of the output voltage $V_0$ by 60°) and at a full output voltage is illustrated in the waveform of FIG. 2A. The relationships of input phase angle as a function of the load phase angle for this operation of the frequency changer system 10 at various output voltage ratios is illustrated in graph 1 of FIG. 3A. The output voltage ratio is defined as the ratio of the actual amplitude of the fundamental component of the output voltage and the maximum possible amplitude of the fundamental component of the output voltage, i.e., $r = V_0/V_{0max}$.

The output voltage waveform $V_0$ of the frequency changer system 10 corresponding to the conduction intervals of the converters 12 and 14 which are opposite to those of FIG. 2A is illustrated in FIG. 2B. Due to the fact that the converters 12 and 14 utilize bilateral conducting switching elements, either of the converters 12 or 14 can be designated positive or negative converters and therefore, either converter can contribute either the positive or negative portion of the output load current. The relationships of input phase angle as a function of load phase angle at various output voltage ratios for these opposite conduction intervals are illustrated in graph 2 of FIG. 3A. It is noted that the selection of conduction intervals of the converters 12 and 14 opposite to that defined for the conventional naturally commutated cycloconverter as illustrated in FIG. 2A, results in a mode of operation which is the inverse of the naturally commutated cycloconverter with regard to the output voltage waveshape and the input phase angle. It is further noted that the waveshapes of FIGS. 2A and 2B are dependent upon the load phase angle since the converter conduction intervals are selected to coincide with the half-periods of the load current $I_0$.

Figure 3B:
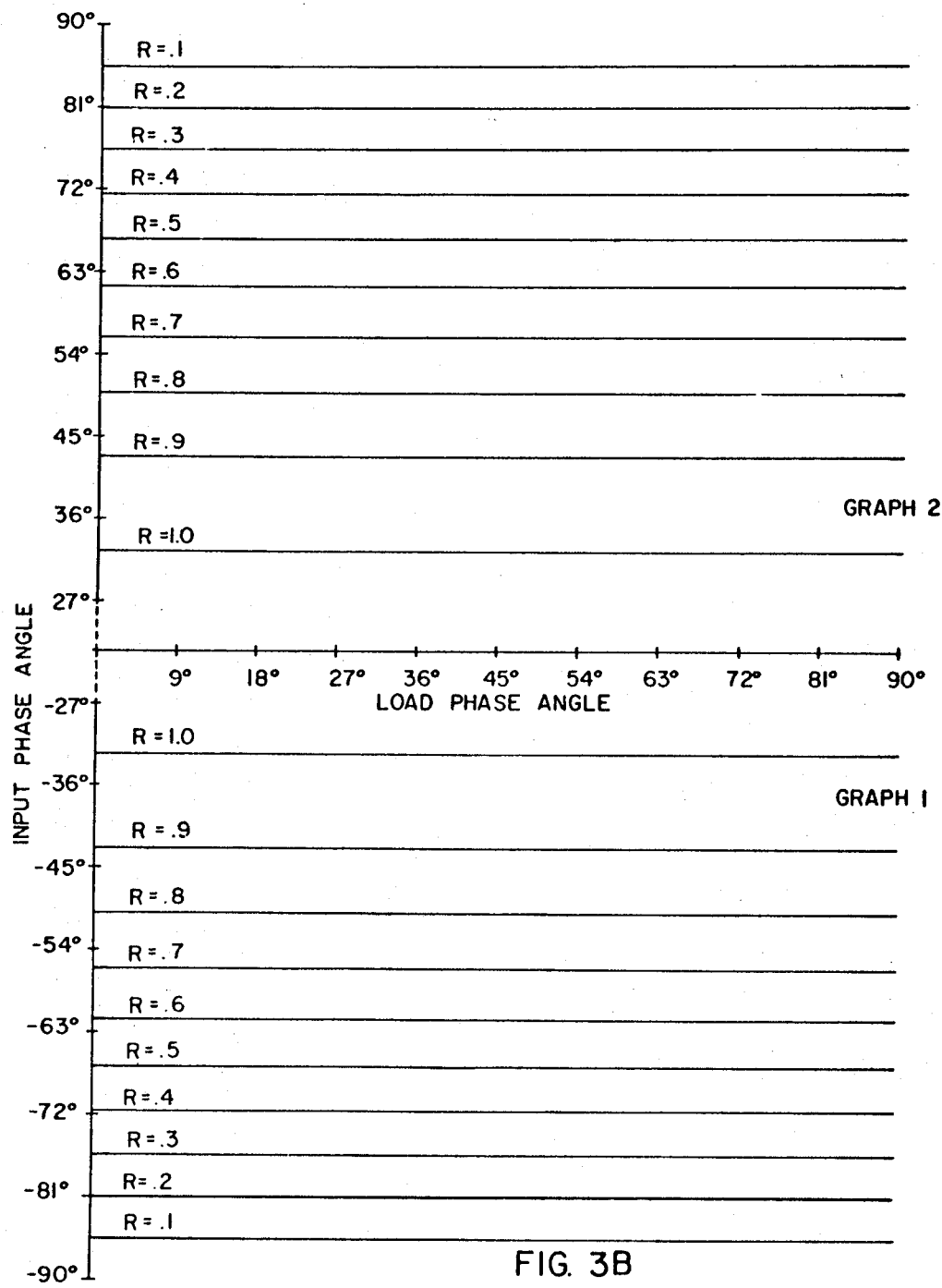

As noted above, it is possible to produce either a constant leading or constant lagging input displacement factor if the conduction intervals of the converters 12 and 14 are set such that one of the converters conducts during the first half of the output voltage half-cycle and the second converter conducts during the other half-cycle of the output voltage. The output voltage waveforms corresponding to a constant lagging input displacement factor is shown in FIG. 2C and those corresponding to a constant leading input displacement factor is shown in FIG. 2D. The related input phase angles are shown in graphs 1 and 2 of FIG. 3B, respectively at various output voltage ratios. It is noted that in either of these cases the output voltage waveform is independent of the load current $I_0$ since the conduction intervals of the converters 12 and 14 coincide with the half-periods of the output voltage.

The specific situation described above indicates techniques for controlling the input power factor of a frequency changer system comprised of a first and second converter employing bilateral switching elements. This technique is based upon the recognition that through selective displacement of the conduction intervals of the converter comprising the frequency changer system with respect to a time reference e.g. the output voltage $V_0$ of the frequency, changer system, the desired input phase angle and the corresponding input displacement factor may be established. The effect of this shifting or displacement of the conduction intervals of the converters with respect to the chosen time reference, i.e. the beginning of the output voltage, is graphically illustrated in FIGS. 4, 5 and 6. The conduction interval displacement, hereinafter defined as rho ($\rho$), of the converters 12 and 14 to establish the waveforms illustrated in FIGS. 4 and 5, respectively, is zero. The frequency changer output waveform $V_0$ illustrated in FIG. 6 is a composite of selected portions of the waveform illustrated in FIGS. 4 and 5. The magnitude of the output voltage waveform $V_0$ of FIG. 6 corresponds to full output voltage, therefore, the ratio ($r$) of the actual output voltage to the maximum output voltage is one. Inasmuch as the fundamental component of the voltage waveforms illustrated in waveform A of FIGS. 4 and 5 are the same, the selection of portions of these waveforms to fabricate the composite output waveform as illustrated in waveforms B of FIGS. 4 and 5, respectively, may be shifted plus or minus rho by circuit 30 to establish the desired input displacement factor. The relationship of the displacement angle rho to the input phase angle, the load phase angle and the output voltage ratio is defined as follows:

$$\Phi = \tan^{-1}\left\{ \frac{-\frac{4a_{1,0}}{\pi}\sin(\psi-\rho) + \frac{2}{\pi}\sum_{n=1}^{\infty}\left[a_{1,2n}\left(\frac{(-1)^n}{2n-1}\sin[\psi+(2n-1)\rho] - \frac{(-1)^n}{2n+1}\sin[\psi-(2n+1)\rho]\right)\right]}{r\cos\psi} \right\}$$

where $\Phi$ input phase angle $\psi$ load phase angle $\rho$ conduction interval displacement $n = 1, 2, 3, \ldots$ $$a_{1,0} = \frac{1}{\pi} \int_0^\pi \cos [\sin^{-1} (r \sin \omega_o t)] d(\omega_o t)$$

$$a_{1,2n} = \frac{2}{\pi} \int_0^\pi \cos [\sin^{-1} (r \sin \omega_o t)] \cos (2n\omega_o t) d(\omega_o t)$$

$\omega_o = 2\pi f_o$ $f_o$ = output frequency (frequency of the generated output voltage)

$t$ = time

Figure 7A:
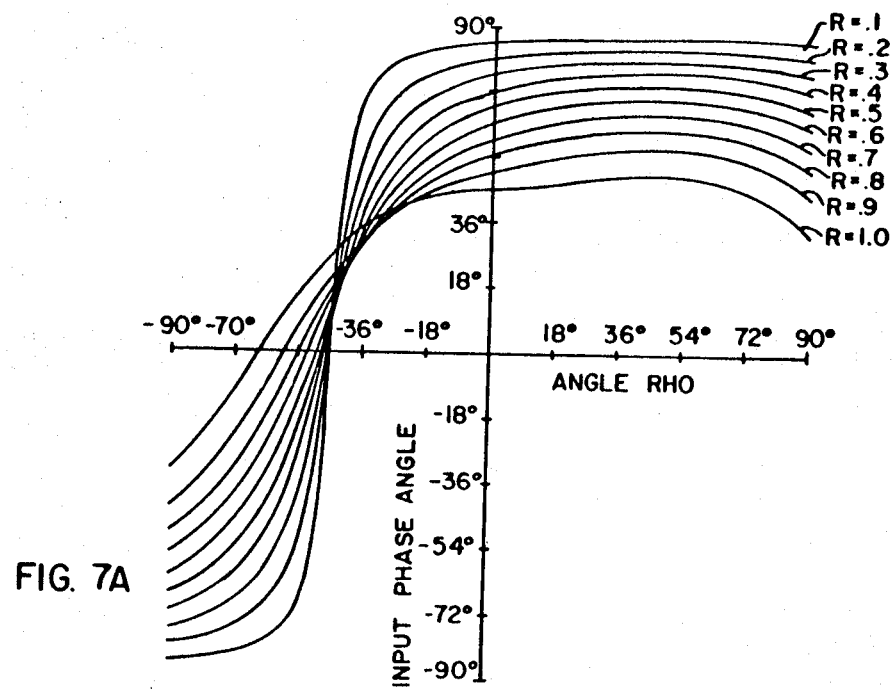
FIGS. 7A, 7B and 7C are graphical illustrations of the relationships of input phase angle, displacement angle of conduction relative to the fundamental component of the output voltage, and load phase angle at voltage ratios from 0.1 to 1.0.
Figure 7B:
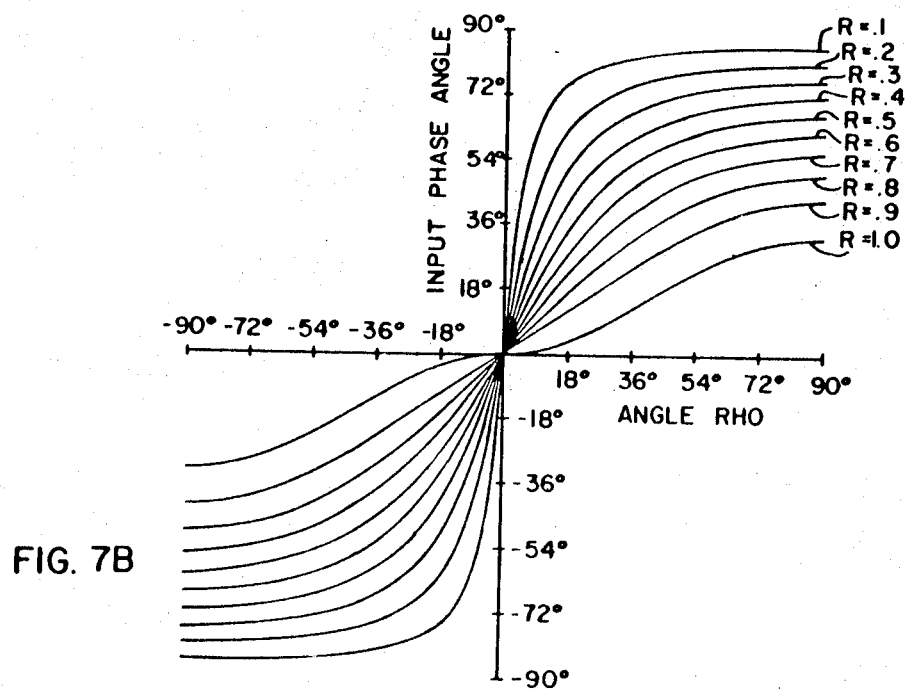
Figure 7C:
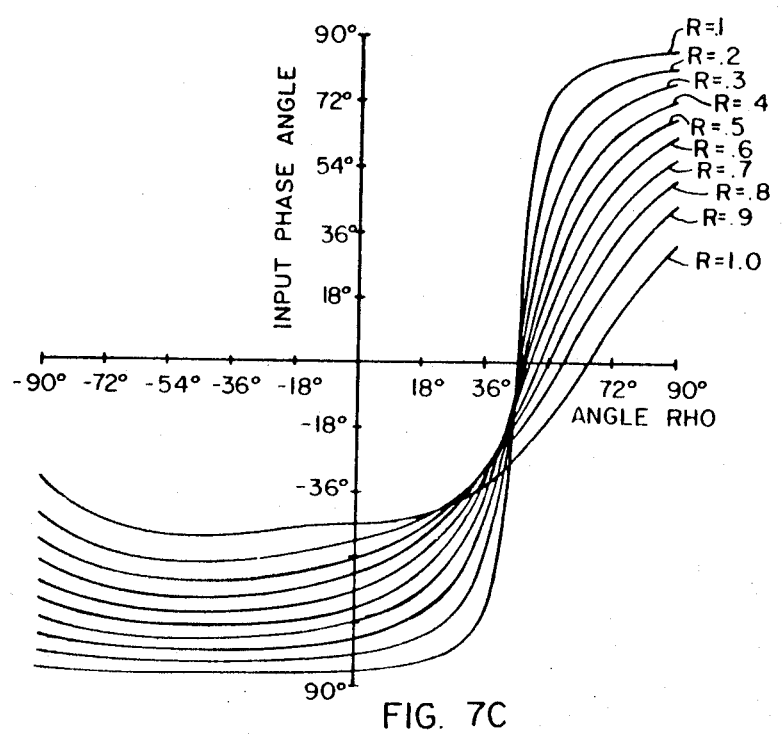

The relationships defined by the above equation are illustrated graphically in FIGS. 7A, 7B and 7C for load phase angles of −45°, 0° and +45°, and at output voltage ratios ranging from 0.1 to 1.0.

While the above discussion has been directed to the schematic embodiment of FIG. 1, and has been limited to converter conduction intervals corresponding to half-cycles of the output waveform, the novel control technique disclosed for varying the input power factor of a frequency changer system applies likewise to other frequency converter configurations and to conduction intervals other than the half-cycle conduction intervals.

Furthermore, it is apparent that either of the converters 12 or 14 could individually satisfy the requirement for a dual converter frequency changer in that each utilizes bilateral switching conducting elements which are capable of conducting both the positive and negative load current.

Therefore, it is sufficient to employ one converter to generate the segments of the composite output waveform.

I claim as my invention:

1. In a frequency changer system for converting AC input supply voltage of a first frequency into AC output voltage of a second frequency for application to an electrical load, the combination comprising, a converter means including a plurality of conduction controlled bilateral switching means operatively connected between a source of said AC input supply voltage and said electrical load, each of said conduction controlled switching means being capable of supporting electrical conduction in both a forward and reverse direction, firing control circuit means operatively connected to said converter means to establish a first and second set of firing instants and to generate a first and second set of firing pulses to operate said bilateral switching means to develop a first and second plurality of voltage segments each exhibiting substantially the same fundamental component, means for generating gating signals controllably displaced with respect to said fundamental components, means for alternately gating said first and second set of firing pulses in response to said gating signals to develop said AC output voltage comprised of alternate portions of said first and second plurality of voltage segments, the controlled displacement of said gating signals with respect to said fundamental component functioning to provide control of the input displacement factor of said converter means.

2. In a frequency changer system as claimed in claim 1 wherein said plurality of conduction controlled bilateral switching means form a first and second converter circuit.

3. In a frequency changer system as claimed in claim 2 wherein said first set of firing pulses gated by said means for gating approximates one half cycle of said AC output voltage and said second set of firing pulses gated by said means for gating approximates the other half cycle of said AC output voltage so as to coincide approximately with the zero crossover of the AC output voltage such that said first converter conducts for one half cycle of said AC output voltage and said second converter conducts for the alternate half cycle of the AC output voltage.

4. In a frequency changer system as claimed in claim 1 further including a naturally commutated cycloconverter circuit, said means for generating gating signals establishing said input displacement factor of said converter means as the mirror image of the input displacement factor of said naturally commutated cycloconverter, and means for combining the AC output waveforms of said converter means and said naturally commutated cycloconverter, the combination of said converter means and said naturally commutated cycloconverter producing a frequency changer system having a unity input displacement factor.

5. A method for controlling the input displacement factor of a frequency changer system including a plurality of conduction controlled bilateral switching means arranged to form a converter circuit which is operatively connected between an AC input voltage source and an electrical load comprising the steps of, developing firing instants and corresponding firing pulses for said bilateral switching means such that said converter circuit means is capable of generating a first and second intermediate output waveform each having approximately the same fundamental component, generating gating signals controllably displaced with respect to said fundamental component, alternately gating portions of said firing pulses corresponding to said intermediate output waveforms to fabricate an AC output voltage, and controllably shifting said gating signals with respect to said fundamental component to vary the input displacement factor of said frequency changer system.

6. A method as claimed in claim 5 wherein said converter circuit means includes a first and second converter, said first intermediate output waveform being the output waveform of said first converter circuit and said second intermediate output waveform being the output waveform of said second converter.

* * * * *